United States Patent [19]

Phillips

[11] Patent Number: 4,600,232
[45] Date of Patent: Jul. 15, 1986

[54] BRACKET KIT

[76] Inventor: W. Dale Phillips, 2132 Tedrow #89, Toledo, Ohio 43614

[21] Appl. No.: 634,164

[22] Filed: Jul. 25, 1984

[51] Int. Cl.⁴ ............................................. B60P 3/00
[52] U.S. Cl. ...................................... 296/3; 403/171; 403/172
[58] Field of Search .......................... 293/3; 211/182; 403/232.1, 171, 172, 176, 403; 285/50

[56] References Cited

U.S. PATENT DOCUMENTS 2,839,320  6/1958  Hill ...................................... 403/172
2,888,072  5/1959  Nicholas ............................. 403/172
4,423,899  1/1984  Langmead ............................. 296/3

FOREIGN PATENT DOCUMENTS 910183  11/1962  United Kingdom ................ 403/171

Primary Examiner—Robert R. Song
Attorney, Agent, or Firm—Paul F. Stutz

[57] ABSTRACT

A frame or rack of off-the-shelf cold rolled tubing, is erected on rear of pick-up trucks, employing novel multi-piece bracket, formed of die stamped pieces designed to define reinforced channels of the tubing in two and three dimensional array.

5 Claims, 6 Drawing Figures

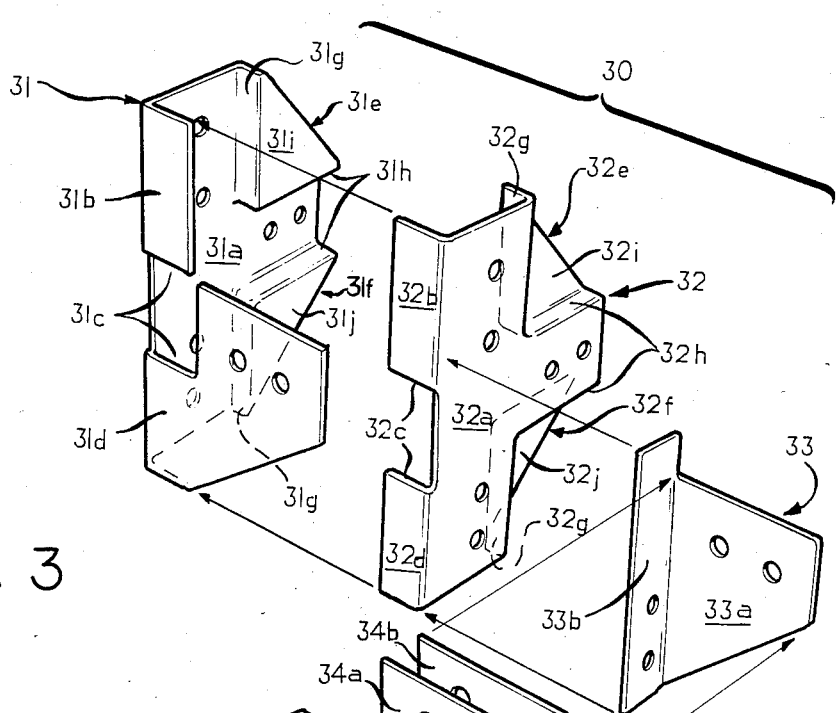
FIG. 3
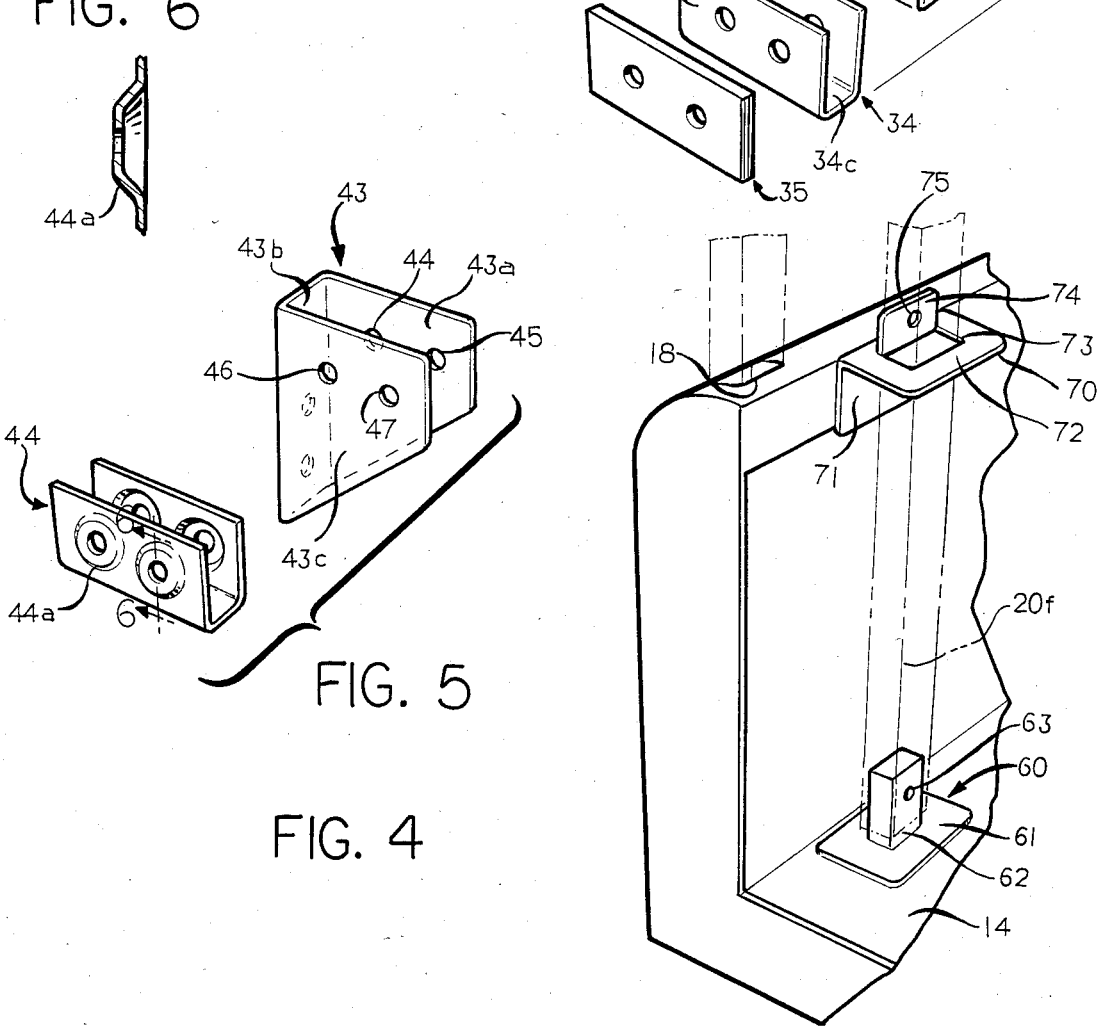
FIG. 6
FIG. 5
FIG. 4

BRACKET KIT

The present invention relates to the skeletal frame work construction art and/or automotive art.

More particularly, the present invention relates to a bracket/kit for securely connecting and holding standard size linear members in mutual spatial array and support to define, independently, or in cooperation with other structures, an enclosure, rack or the like.

Significantly, and uniquely, the present invention is seen to reside in the combination of a novel bracket/kit, standard size tubing and a pick-up truck inclusive of a rear load carrying deck featuring a generally rectangular horizontal platform and, optionally, upstanding rear wall, either permanently mounted, or pivotably, all as well understood in the art.

The latter pick-up trucks are available in a variety of sizes, configurations and combinations by a number of automotive manufacturers, here in the United States and abroad.

Generally, the cargo carrying capacity of the available pick-up trucks or the like, are limited by the size of the deck and the extent of the vertical upstanding side walls. Panel trucks and vans featuring higher walls and a roof, provide protection and a somewhat enlarged capacity in some respects, (the roof also limits the capacity), but at considerable expenditure. Prefabricated side wall/roof combinations, known in the market as "caps" are also available, but are quite expensive, and, additionally, limit the capacity due to the inclusion of a roof.

I am aware that the art has suggested a variety of skeletal, net work, frame work, or erector set like arrangements for cooperative assemblement with open deck, pick-up trucks. These prior art devices; however, are deficient in a variety of respects. Some are too cumbersome, some are impractical and some are expensive! Others embody a combination of these negative and undesirable features or deficiencies, including lack of standardization and complexity. Illustrative of art suggested carrier racks, possessing one or more of the foregoing deficiencies include U.S. Pat. Nos. 4,405,170; 4,057,281; 3,765,713; 4,423,899; 2,947,566; and 4,211,448.

With the foregoing introduction, it may be stated, as a general object of the present invention, to provide a technique, system, kit or novel assembly, which addresses the deficiencies of the known devices and serves to provide a low cost, simplified and effective skeletal frame work arrangement or rack enclosure.

It is a particular object of the present invention to provide such an arrangement which utilizes conventional and available linear elements available at relatively low cost due to standardization.

It is another object of the present invention to provide a kit in the form of a simplified, yet extremely strong reinforcing bracket designed to fit standard-sized, available tubing, itself of considerable strength.

It is yet another object of the present invention to provide a multiple piece bracket in which each piece is capable of being produced as a stamping and thus lending further cost savings and/or economy to the ultimate user or consumer.

It is yet another object of the present invention to provide brackets which embody a design and configuration which enables mutual assemblement, together with securement to the linear standardized tubing lengths, thereby increasing the simplicity and quickness of set up time in arriving at a completion of the carrier rack cargo enlarging arrangement of the present invention.

The foregoing, and, as well, other objects of the present invention, will become apparent to those skilled in the art from the following detailed description taken in conjunction with the annexed sheets of drawings, in which there is presented, for purposes of illustration only, a singled embodiment of the present invention, as currently envisioned.

IN THE DRAWINGS

FIG. 3 is a three-quarter perspective view of the bracket assembly but with individual compenents in exploded spaced apart relationship to better reveal the constructional detail.

FIG. 4 is a three-quarter perspective view of a pick-up truck with the bed and side wall bearing ancillary mounting accessories, or components, for use in erecting and supporting the carrier rack in accordance with a variant embodiment of the present invention.

FIG. 5 is a three quarter perspective view like FIG. 3 but illustrating a variant construction of a bracket sub assembly.

FIG. 6 is a sectional view taken on the line 6—6 of FIG. 5.

Viewed most simply; the present invention contemplates an arrangement for modifying and thereby increasing the capacity of a standard pick up truck featuring a rear deck and, optionally, upstanding partial side walls located along the margins of the rear deck portion of the pick-up truck; the arrangement featuring principally, a bracket construction designed for cooperative assemblement and securement with standard size tubing of generally rectangular, cross-sectional configuration. The invention is additionally viewed as comprising a kit composed of assembleable parts or components, a set of simplified instructions and complementary sketches illustrating the assembling and use of the parts in erecting a standardized structure, utilizing readily available, off the shelf tubing and thereby yieldative of a integrated, frame work definitive in aggregate array, of an enclosure which supplements cargo carrying capability of a standard pick up truck.

Figure 1:
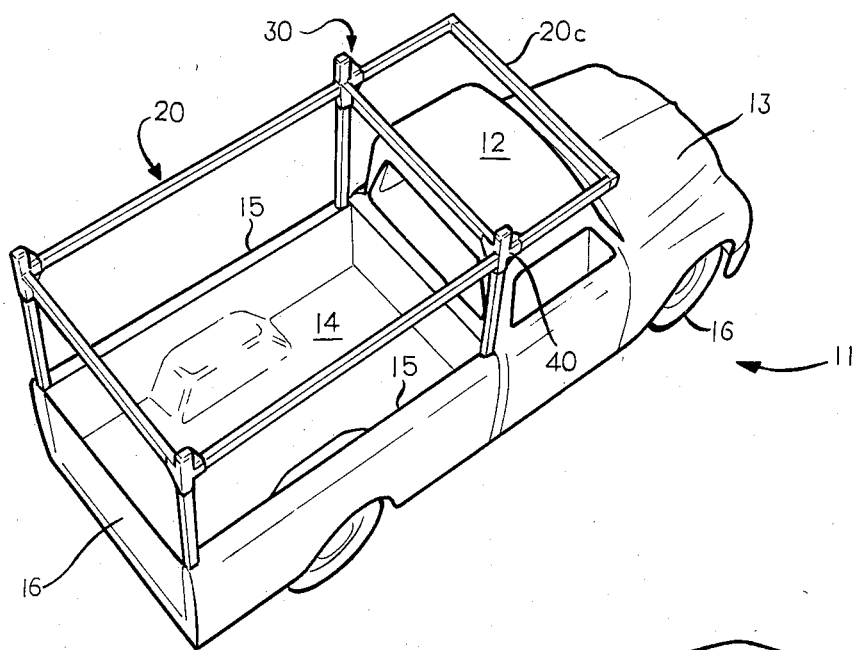
FIG. 1 is a three-quarter perspective, partially schematic view of a panel truck having in assemblement therewith, a skeletal frame work or carrier rack and bracket in keeping with the broad scope of the present invention.

Referring now more specifically to the drawings, there is shown in FIG. 1, a pick up truck 11, featuring, as do most, a roofed and windowed driver and passenger cab 12, a forward hood covering an engine (not shown), a rear cargo carrying space defined by a flat horizontal deck 14 with parallel, upstanding, marginal side walls 15 and a drop rear panel 16 for access. Additionally, the truck features wheels 16, only two being shown and a net work of tubing generally designated by the reference numeral 20 but held together by four brackets 30 located at the corners of the deck 14 and secured to four upstanding lengths of standardized 2"×1"×⅛" wall (thick) cold rolled tubing.

Figure 2:
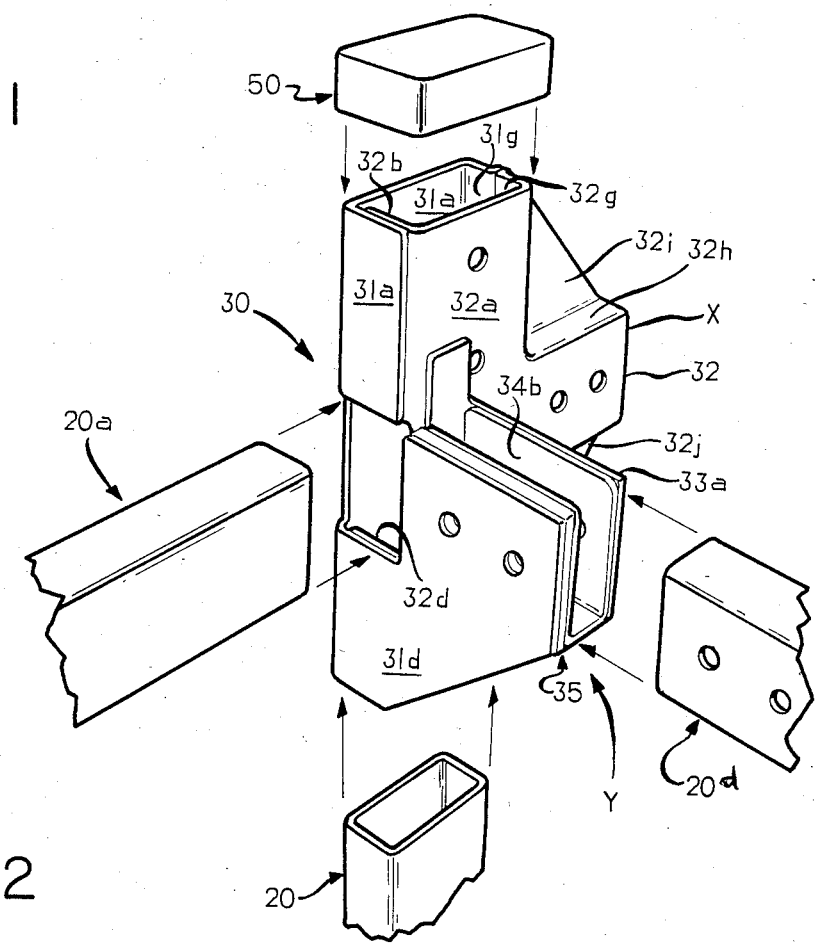
FIG. 2 is a three-quarter perspective, partially schematic view of a principal feature of the present invention consisting of a specially designed bracket assembly receptive of lengths of standard tubing and in part illustrating the universality of the bracket and the strength reinforcement features.

Details of this principal feature of the present invention; to wit: the bracket 30, can be seen by reference to FIGS. 2 and 3. In FIG. 2, the components are in assemblement adapted to receive the standardized tubing as illustrated and indicated by the arrows. In FIG. 3, the bracket, is shown composed of its individual pieces, identified respectively by the reference numerals 31, 32, 33, 34 and 35 in spaced apart relationship. These pieces are formed of sheet metal, generally of a thickness which permits the illustrated shapes to be formed by a combination of cutting, punching or stamping and bending to yield the configurations as illustrated.

Starting with the flat sheet metal, the pieces 31 are generally formed thereof first by cutting and bending and, at the same time, punching the holes. The piece is then stamped in an appropriate die to form the somewhat complicated configuration as shown.

In the case of bracket piece 31, a principal planer wall 31a is integrally connected to a minor rectangular flange 31b, normal to wall 31a and, separated by notch 31c, a major flange 31d, sometimes referred to as a web, also normal to wall 31a and bearing the spaced apertures as shown. Piece 31 also includes, as a result of a stamping operation, two similar offsets 31e and 31f which simultaneously define aligned vertical surfaces 31g and parallel spaced apart horizontal surfaces 31h. The two offsets include flat triangular web surfaces 31i and 31j.

Bracket piece 32 includes a principal planar wall 32a and a connected perpendicular flange 32b separated by notch 32c from an identical perpendicular flange 32d. Bracket piece 32 also includes, as a result of the stamping operation, two offsets 32e and 32f and like piece 31, aligned vertical surfaces 32g and horizontal surfaces 32h. The two offsets 32e and 32f include flat triangular web segments 32i and 32j which are congruent to web segments 31i and 31j.

Bracket piece 33 consists of a flat planar odd shaped segment 33a containing apertures and a connected perpendicular flange 33b.

Bracket piece 34 is essentially "U" shaped and features apertured side walls 34a and 34b joined by elongate parallel connector 34c.

Bracket piece 35 is a rectangular spacer or filler (with matching holes), when the pieces 31, 32, 33 and 34 are brought into assemblement to yield the arrangement of the pieces as shown in FIG. 2.

As can be seen, when the pieces 32 and 31 are brought together in the manner indicated by the arrows (Fig. 2), the flanges 31b and 32b assume flush relationship. At the same time, the notches 31c and 32c assume registration, while lower flange 32d of piece 32 is flush with a portion of major flange 31d; which otherwise extends outwardly. At the same time, the offsets 31e and 32e are brought together with the triangular web surfaces 31i and 31j in flush abutment with the triangular web surfaces 32i and 32j. Simultaneously, wall surface 31g assumes side by side relationship with wall surface 32g and similarily wall surface 31h assumes side by side relationship with wall surface 32h. As thus held together, in the manner described, there is defined a rectangular channel passageway adapted to receive a length of 1"×2" tubing 20. Also defined is a rectangular horizontal channel extending through the registered cutouts 31c and 32c to the flange regions 31h and 32h for receiving tubing 20a at the left of FIG. 2 and thence beyond the bracket in the manner shown in FIG. 1 to join cross member 20c.

Returning to the bracket 30, as shown in FIG. 3, the arrows serve to illustrate the manner of bringing, flushly together, the "U" shaped piece 34 with wall 34b flush against wall 33a with holes aligned. Similarily, the spacer plate 35 is flushly abuted against wall 34a of the "U" shaped member 34 and thence the flanged wall piece 33 moved to the left against wall 32a of bracket piece 32 to cause the major flange 31d of piece 31 to assume flush relationship with spacer 35 and with all holes, in bracket piece 33, "U" shaped member 34, spacer plate 35 and major flange 31d, of bracket piece 31, in alignment to yield the assembled configuration or appearance as shown in FIG. 2. The "U" shaped piece 34 is thusly supported by the major flange 31d and the wall 33a so that the upper channel opening of the piece 34 can receive the end of another length of tubing identified as 20d in FIG. 2 from which it may extend transversely to a similar bracket 40 (see FIG. 1) which is identical to that of FIG. 3 but of reverse hand constructional detail as would be well understood in the art or by those understanding the sheet metal or stamping art. In other words, if the bracket 30 is considered of "left hand" construction; the bracket 40 would be designed of "right hand" contructional detail.

The holes shown in the drawing, although not numbered, serve to connect the rectangular tubing to the bracket pieces generally in the manner illustrated in order to provide a strong unified frame work of great strength. Reference numeral 50 identifies a plastic cap which telescopes onto the top end of the bracket 30 to prevent rain from accumulating in the channel or to enter the interior of the tubing projecting upwardly from below (Fig. The cap 50 can be removed and a length of tubing inserted if it is desired to erect another net work of horizontal tubing located one or more feet upwardly from the present bracket by using another set of four brackets.

It may be here indicated that the brackets at the rear corners of the pick up truck are similarily constructed to that as described in FIGS. 2 and 3 excepting that the notch 31c and 32c are not needed since the tubing does not project beyond the rear of the cargo carrying bed or another words, beyond the drop panel 16.

From the foregoing detailed description of the constructional details of the die-stamped metal pieces 31, 32, 33, 34 and 35 or components 31, 32, 33, 34 and 35 of the bracket assembly in connection with FIGS. 2 and 3; several very important and novel relationships are established. Thus looking at components 31 and 32, in isolated fashion, in both FIGS. 2 and 3; it can be seen that the flanges 31b and 32b, together with flange 31d and 32d, in combination with wall surfaces 31g and 32g and flat surfaces 31a and 32a define a vertical passageway or channel measuring about 2" by 1". Additionally, the flush abutment of triangular web surfaces 31i and 32i and, at the same time, triangular web surface 31j and 32j, bring the horizontal walls 31h and 32h into abutment, to define a horizontal lateral channel which, if desired, can extend all the way through the notch region 31c and 32c in the parts 31 and 32 respectively. Thus, the tubing, as shown in FIG. 2, could project upwardly and vertically all the way through the bracket and beyond that region occupied by the cap 50, if desired. In such case, the channel at the right, defined by wall 32h and, for purposes of this description, given a reference letter "X" in FIG. 2, would be adapted to receive the end portion of an additional length of 2"×1" tubing. At the same time, the combination achieved by the pieces 33, 34 and 35, to create the channel, identified in FIG. 2, for purposes of this description, by the reference numeral "Y", could receive an additional transverse length of appropriate sized tubing.

Reference may now be had to FIGS. 4, 5 and 6 for disclosure of a variant construction of a portion of the bracket 30 of the present invention. In this variant embodiment, parts 33, 34 and 35 are eliminated in favor of parts 43 and 44. Part 43 is much like part 33 except for the inclusion of an additional perpendicular flange 43c generally congruent to the flange 43a. Flange 43a is identical to flange 33a. Additionally, the base portion 43b is like the base or center portion 33b except the top portion is eliminated as clearly shown. The flange 43a features spaced apertures 46 and 47 in axial alignment with the apertures 44 and 45. The "U" shaped piece 44 is like "U" shaped piece 34 excepting that the individual apertures (unnumbered in FIG. 3), are located in punched dimple portions 44a (by a punching operation). The dimple portions 44a, function somewhat like washers and fill the space in substitution of the spacer or filler plate 35.

In this fashion, the apertures in base 43b will align with holes in bracket piece 32.

The foregoing description represents a disclosure of the universality of the bracket of the present invention.

In the embodiment, as shown in FIG. 1, the bracket is employed such that the lateral tubing 20a extends through the notches and the channel "X" and beyond to the cross piece 20c of tubing utilizing a corner connector whose details need no detailed disclosure other than suggesting that it could be in the form of a telescopic piece or any other form of a connector to join the ends together and form the corner. In this embodiment, additionally, the vertical segment of tubing extends up the bottom of the channel defined by pieces 31 and 32 and the end comes to rest on the bottom surface of horizontal tube 20a. In this embodiment, the plastic cap 50 is used. Also the pieces 33, 34 and 35 are employed to form the web-reinforced channel upon which rests the lateral tubing 20d. The tubing extending through the notches, as above described, extends rearwardly to another bracket at the rear of the truck and being essentially identical to the bracket of FIG. 2 and FIG. 3 excepting for elimination of the cut outs 31c and 32c as earlier referred to.

In the practice of the present invention, the securement of the 2"×1" cold rolled tubing to the truck, may be accomplished using several accessory members such as the shoe bracket 60 and the guide support 70 as shown in FIG. 4. The shoe bracket 60 is composed simply of a flat, horizontal plate 61 bolted to the deck 14, but including an upstanding stud 62 which is integral with the base plate 61 and telescopically projects into the bottom or terminal end of the vertical tubing, shown in dotted outline and identified by the reference numeral 20f. The tubing is bolted as at 63 to shoe bracket 60. The guide support 70 is composed of a bent and cut metal piece to yield a segment 71 which is bolted to the vertical side rail 18 of the pick-up truck 11 and includes an integral horizontal portion 72 which is cut at 73 to provide an opening for the tubing 20f to extend upwardly. The cut out or tab portion 74 is bolted to the side rail via bolt 75.

It is, of course, observed that some pick-up trucks are supplied with a cavity or recess, such as that identified by the reference numeral 18, in FIG. 4, and which is either already 2"×1" in dimension, or can be readily adapted with spacer plates to define the desired 2"×1" dimension for receiving cold rolled tubing of 2"×1" rectangular configuration. In either case, the tubing is appropriately and suitably anchored to the truck in the same spirit of rigidity as is embraced by the novel brackets of the present invention.

Returning again to FIGS. 2 and 3, it is important to note, that in addition to the channels, the die-stamping operation, in accordance with the design of the parts, makes provision for the reinforcing web pairs 31i and 31j to come into surface abutment, and, in combination, lend tremendous rigidity to the net work or frame of tubing in accordance with preferred aspects of the present invention.

Note also the novel provision for the major flange 31d which not only abuts the flange 32d but extends beyond, in assembled configuration, as shown in FIG. 2, to serve in conjunction with flange 33a of piece 33 to serve as anchor connectors for the "U" shaped channel piece 34 which serves to add a third dimension to the bracket in serving as a seat for an end of a length of tubing identified as 20d in FIG. 2.

Looking now at FIG. 2, the universal utility of the bracket is illustrated and seen as being five dimensional, vertically up, vertically down, laterally forward, laterally rearwardly and transversely, in the case of tubing identified as 20d. This universality and the reinforced channels, all producable with flat metal pieces by a die-stamping operation, as opposed to casting, lends tremendous strength at reduced cost and thereby constitutes a significant contribution to the art of the bracket design of the present invention.

In the figures, particularly FIGS. 2 and 3, a number of holes are shown to illustrate that they may be used in conventional fashion with appropriate elongate nut and bolt combinations to secure the bracket and the tubing together.

Generally, the off-the-shelf tubing is purchased without holes drilled in it and it is in the combining of appropriate cut lengths of tubing, with the brackets, that the holes are drilled, using the punched holes in the assembled brackets as guides to determine the proper location of the holes in the terminal ends of the tubing as would therefore be in registry with the holes in the appropriate pieces of the bracket.

In accordance with a general embodiment of the present invention, the brackets are seen as parts of a kit which would be purchasable or obtainable from a suitable retail outlet together with suitable instructions, based upon the disclosure of the present Application or specifications and suitable sketches or drawings, based upon the drawings, accompanying the present Application.

The kit, made up of bracket pieces, instructions, and drawings, may or may not include appropirate nuts and bolts. In accordance with one embodiment; the kit would be composed of four bracket sets of five pieces each; all of which would be pre-stamped, bent, cut and provided with suitable holes as shown in the drawings. The kit would also desirably include pre-formed, bent, punched and cut side guide members 70 and shoe brackets 60, so that one purchasing the kit would be able to erect the rack whether or not the pick-up truck involved was provided with built-in cavities 18 in the side rail of the particular pick-up truck.

Modification and substitutions may be resorted to without departing from the spirit and/or scope of the present invention. All such modification, equivalents, substitutions, and/or minor departures from the explicit description hereinabove, are intended to be considered as included within such spirit and/or scope of the present invention, unless to do so would violate the language of the appended claims.

I claim:

1. In combination, a pick-up truck, having a rear deck, different lengths of rectangular, cross-sectional tubing defining a rack or frame extending vertically above the margins of the rear deck, and a bracket composed principally of two pieces of die-stamped metal inclusive of formed through-channels of rectangular, cross-sectional configuration adapted to position and hold said tubing and a third piece, comprising a "U" shaped channel secureable to said two pieces and serving as a seat for a transverse length of said tubing forming said rack, and means for securing said bracket pieces and tubing together in secure relationship to define a rigid net work of said tubing to define said rack or frame to thereby enlarge the cargo capacity or cargo carrying capacity of said pick-up truck.

2. The invention, as claimed in claim 1, wherein one of said pieces includes an integral, generally triangular web, serving as an anchor for said "U" shaped channel to thereby lend rigidity to a three dimensional net work of said tubing.

3. The invention, as claimed in claim 2, wherein said bracket includes a "U" shaped channel securable thereto to serve as a seat for transverse lengths of said tubing forming said rack.

4. The invention, as claimed in claim 3, wherein said die stamped metal pieces include, in each, a reinforcing web in flush abutment with its counter part to additionally rigidify and strengthen said bracket and rack of tubing.

5. The invention, as claimed in claim 3, wherein one of said pieces includes an integral, generally triangular web, serving as an anchor for said "U" shaped channel to thereby lend rigidity to a three dimensional net work of said tubing.

* * * * *